(51.)
GEORGE W. WILLIAMS.
Improvement in Excavators.
No. 122,344. Patented Jan. 2, 1872.
Fig. 1.
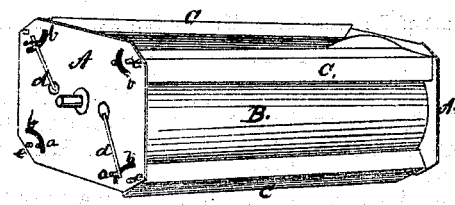
Fig. 2.    Fig. 3.
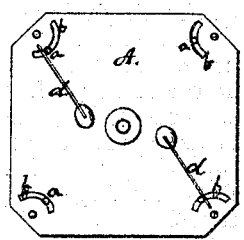 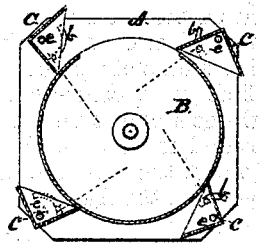
Fig. 4.
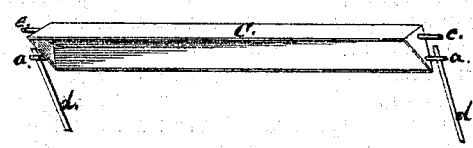
Witnesses.
C. H. Poole.
R. Hadaway
Inventor.
George W. Williams.
Assignor to Edgar Hill.
By G. B. Woodruff, Attorney

UNITED STATES PATENT OFFICE.

GEORGE W. WILLIAMS, OF CORNING, NEW YORK, ASSIGNOR TO EDGAR HILL, OF SAME PLACE.

IMPROVEMENT IN EXCAVATORS.

Specification forming part of Letters Patent No. 122,344, dated January 2, 1872.

*To all whom it may concern:*

Be it known that I, GEORGE W. WILLIAMS, of Corning, in the county of Steuben, and State of New York, have invented certain new and useful Improvements in Scrapers for Excavating Earth; and the following is a full, clear, and exact description of the same, reference being had to the accompanying drawing making a part of this specification, in which—

Figure 1 represents a perspective view of the rotating dirt-receiver, with the yielding buckets as they are pivoted to the heads, with their springs secured on the outer ends. Fig. 2 shows an end view of one of the frame-heads, with the semicircular slots, pivots, pins, and springs. Fig. 3 shows a cross-section of the excavator, earth-receiving cylinder, and buckets which surround it. Fig. 4 shows a perspective view of one of the scraper-buckets and springs detached from the frame and cylinder.

My invention relates to scrapers for excavating earth; and it is an improvement on the rotating dirt-excavator patented to John P. T. Davis, dated September 12, 1871. My improvement perfects the aforesaid invention and makes it of great practical utility; whereas, without my application of springs to movable buckets, it would not operate, for the reason that stones would crowd in between the buckets and the cylindrical drum or earth-receiver and stop it from rotating. My invention consists in the application of springs to operate on the buckets to hold them to their place while rotating round the cylindrical earth-receiver, and allow them to yield sufficiently to prevent small boulders and stones from wedging in, allowing them to pass through and the bucket to come back to its place.

To enable others to make and attach my invention to revolving earth-excavators I will describe it more fully, referring to the drawing.

A is the frame or outer head of one end of the revolving excavator, in which the cylindrical earth-receiver B is placed. $c\ c$ are the angular buckets, pivoted at each of the four corners of the frame-heads A A of the revolving drum, which are provided with pins $a\ a\ a\ a$ projecting through semicircular slots $b\ b\ b\ b$ in the heads A A, upon which pins the springs $d\ d$ have their bearing to hold the buckets C in their proper position. The excavating mechanism and scraper is constructed the same as that shown in the aforesaid Davis patent, with the exception of the mode of hanging the buckets $c\ c$ on pivots $e\ e$, with the semicircular slots $b\ b$, pins $a\ a$, and springs $d\ d$ bearing upon them, thereby producing the practical result above mentioned.

I make no claim to a rotating earth-excavator or the arrangement of the receiving-cylinder with stationary buckets to revolve around it; but What I do claim as my invention is—

The combination of the springs $d\ d$, the hinged or pivoted buckets $c\ c$, with the rotating heads A A and cylindrical earth receiver B, substantially as and for the purposes hereinbefore set forth.

In testimony whereof I hereunto subscribe my name in the presence of—

GEO. W. WILLIAMS,
*Assignor to* EDGAR HILL.

Witnesses:
E. D. MILLS,
GEO. HITCHCOCK. (51)